United States Patent
Tsai et al.

(10) Patent No.: US 6,879,412 B1
(45) Date of Patent: Apr. 12, 2005

(54) METHOD FOR OPTIMIZING THE BEST RESOLUTION OF AN OPTICAL SCANNING SYSTEM AND APPARATUS FOR THE SAME

(75) Inventors: Jenn-Tsair Tsai, Hsinchu (TW); June-Num Chen, Hsinchu (TW)

(73) Assignee: Mustek Systems Inc., Taiwan (CN)

( * ) Notice: Subject to any disclaimer, the term of this patent is extended or adjusted under 35 U.S.C. 154(b) by 786 days.

(21) Appl. No.: 09/635,223

(22) Filed: Aug. 10, 2000

(51) Int. Cl.[7] .............................................. B41B 1/419
(52) U.S. Cl. ...................... 358/1.2; 358/406; 358/504; 358/452; 358/482; 358/483; 235/426.23; 235/426.02
(58) Field of Search .................... 358/1.2, 406, 504, 358/452, 482, 483; 235/462.23, 462.02, 462.04, 462.24

(56) References Cited

U.S. PATENT DOCUMENTS

| | | | | |
|---|---|---|---|---|
| 5,642,202 A | * | 6/1997 | Williams et al. ............ | 358/406 |
| 6,016,207 A | * | 1/2000 | Wield ......................... | 358/406 |
| 6,178,015 B1 | * | 1/2001 | Lee et al. .................... | 358/486 |
| 6,557,762 B1 | * | 5/2003 | Tsai et al. .................... | 235/454 |

* cited by examiner

*Primary Examiner*—Kimberly Williams
*Assistant Examiner*—Negussie Worku
(74) *Attorney, Agent, or Firm*—Lowe Hauptman Gilman & Berner, LLP

(57) ABSTRACT

The present invention provides a method and an apparatus for fast finding the best resolution of an optical scanning device during assembling steps. The present invention improves the graphics of the calibration device. Accompanying with calculation of an adjustment device, the present invention generates a referencing parameters. The parameters represent the resolution of the optical scanning device; and further is able to show the balance of horizontal resolution and the balance of vertical resolution. In this case, technicians can optimize the best position of the lens in order to build an optical scanning with precision and narrow the misalignment during assembly.

9 Claims, 4 Drawing Sheets

METHOD FOR OPTIMIZING THE BEST RESOLUTION OF AN OPTICAL SCANNING SYSTEM AND APPARATUS FOR THE SAME

BACKGROUND OF THE INVENTION

1. Field of the Invention

The present invention generally relates to a method and an apparatus for fast finding and optimizing the best resolution of an optical scanning device.

2. Background Description

Generally, an optical scanning system employs many components such as an image capturing device, lenses and so on, to assemble a scanning module with high precision. The scanning module can generate and record an image of an object after proper alignment and calibration. The scanning module further would be able to transform the captured image to digital signals with carrying out the visual image. In this case, the scanning process is completed. Therefore, a precise alignment and good assembly quality are a very important cause to the scanning module.

In FIG. 1, there is shown a traditional alignment and assembly method of a scanning module. The scanning module (not shown in FIG. 1) includes at least a scanning module 10 having a document glass 101, a lens 102 and an image capturing device 103. The image capturing device 103 generally is a Charged-Coupled Device (CCD). In addition, there are additional supporting device needed to assemble a traditional optical scanning system, such as calibration device 11, an adjusting device 12 connected to the image capturing device 103. The adjusting device 12 references signals from the image capturing device 103 for displaying parameters or signals, in order to inform the assembling technicians to identify the status of assembly.

Consequently, FIG. 2 shows the schematic demonstration of the calibration device 11. There is a print 110 on the surface of the calibration device 11. The print shows multi parallel lines, for calibration and detection purpose.

Further, please refer to FIG. 3. FIG. 3 shows a char of Modulation Transfer Function (MTF)—Position of the Lens. The MTF is a known mathematic fiction. If the value of MTF 31 is higher, the resolution of the scanning module is greater. On the other hand, lower value of the MTF means lower resolution of the scanning module. The horizontal dimension of the chart represents the position of the lens 32. Usually, the curve 30 of the chart of the MTF-PL will be different for different scanning module 10. When the researching and developing engineers determine which scanning module is implemented, the curve 30 of the chart is fixed. Therefore, for a fixed shape of the chart of MTF-PL, there is a maximum value for the MTF. In theory, as shown in the figure, the best resolution of the scanning module will be achieved if the lens 34 is placed on the point where the value of MTF is the maximum. In practice, it is very difficult to assemble the scanning module precisely having the best resolution, namely, making the position of lens in the point where the MTF achieves the maximum value, due to the misalignment. Thus, if the value of the MITF can be set above a certain level, the resolution of the scanning module is acceptable by the user. In FIG. 3, if the point where the lens is placed is in the tolerant range 36, the value of the MTF of the scanning module will be kept above the MTF tolerant value 35. In view of the above, the position of the lens is the major issue of the resolution of an optical scanning device.

Accordingly, the assembly of the traditional optical scanning device includes the steps of the followings. Firstly, the assembling technician mounts the document glass 101 and the image capturing device 103. The lens 102 is able to move along a specified direction linearly, as shown in FIG. 1. The lens is further temporarily fixed in a predetermined position. A calibration device 11 is placed on the document glass 101. The calibration device 11 contains a print 110. Please refer to FIG. 2. The optical scanning device further includes a light source (not shown in the figure). The light source provides a light illuminated on the document glass 101 and later reflected by the calibration device 11. The light is transmitted via an optical route 104 to the lens 102, and generated an image on the image capturing device 103. The image capturing device 103 generates digital signals. In this point, the adjusting device 12 calculates the MTF by referencing the digital signals and displays the result. In this case, the value of MTF presents the resolution of the calibration device 11, which is placed in the document glass 101. The assembling technician is therefore able to adjust the position of the lens in order to get the maximum value of MTF, and fixes the lens at the position where the value of MTF is maximum or above the MTF tolerant value. If the value of MTF is maximum, the best resolution of the optical scanning device is achieved.

The calibration device 110, described in the above for adjusting the scanning system, only has one print, and the print contains plural parallel lines. The vector on X-axis and the vector on Y-axis of the lines give the adjusting device 12 basis to calculate the value of MTF for representing the resolution of the X-axis and Y-axis. Moreover, some calibration devices only provide plural parallel lines in one direction, such as X-axis or Y-axis. In this case, the assembling technician only get the reference resolution in one direction. Practically, due to the misalignment of the assembly, the axis of the lens 102 is usually unable to be perpendicular to the document glass. Thus, the axis of the lens has an inclined angular with the X-axis or Y-axis, as shown in FIG. 4A. Upmost, there are possibly containing two inclinations along X-axis and Y-axis. In this case, the X-axis resolution and the Y-axis resolution of the same point are different. Therefore, the best position of the lens cannot be obtained in this respect. Since a standard resolution can be obtained via traditional skills, the quality of assembled scanning devices would be reduced if the position of the lens only relies on one direction, such as X-axis or Y-axis.

In view of the above, it is important to provide a method and an apparatus for optimizing the best resolution of an optical scanning device in this industry.

SUMMARY OF THE INVENTION

It is therefore an object of the present invention to provide a method and an apparatus for fast finding the best resolution of an optical scanning device in order to speed up and simplify the assembling processes.

It is another object of the present invention to provide a simplified assembling process in order to increase the product quality and to reduce the cost of the optical scanning device.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention is directed to an improvement of the print of the calibration device. By the calculation of the adjusting device, there is generated a referencing parameter for fast finding and optimizing the best position of the lens. In this case, a high precise assembling process is obtained and thus reduces the misalignment caused by different technicians with different skills.

Figure 1:
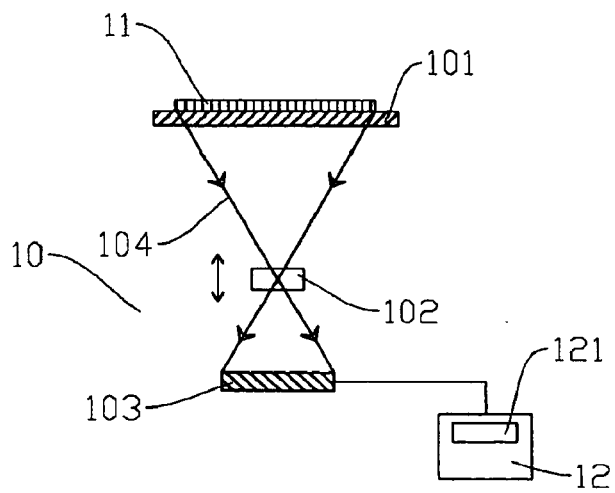
FIG. 1 is a schematic demonstration of a traditional scanning module.
Figure 2:
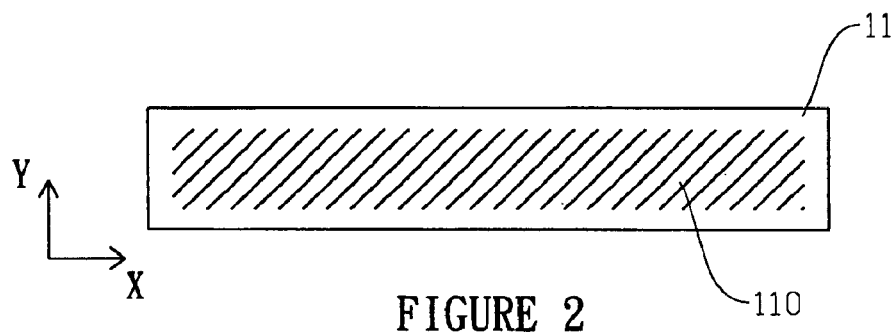
FIG. 2 is a schematic demonstration of a calibration device.
Figure 3:
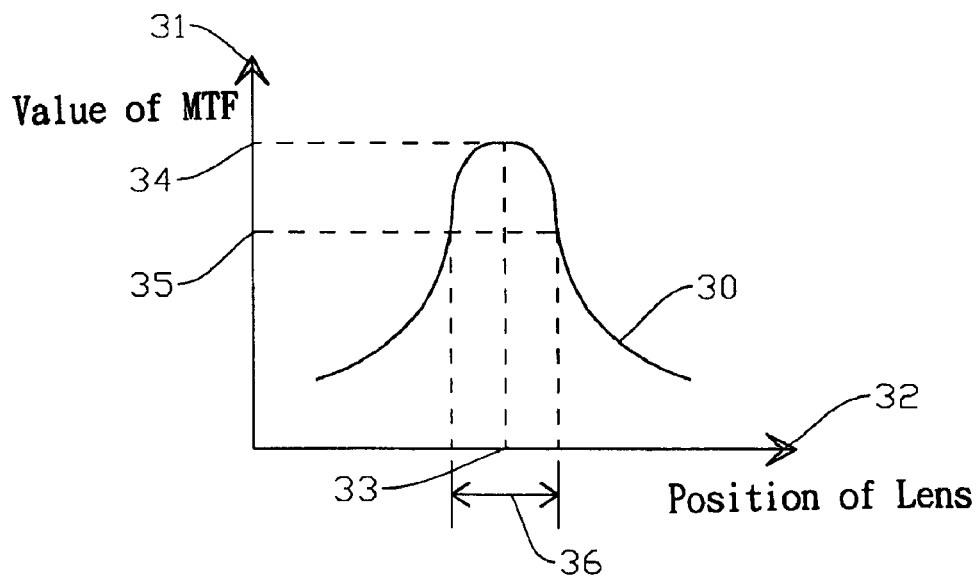
FIG. 3 shows a chart of MTF-PL of a scanning module.
Figure 4A:
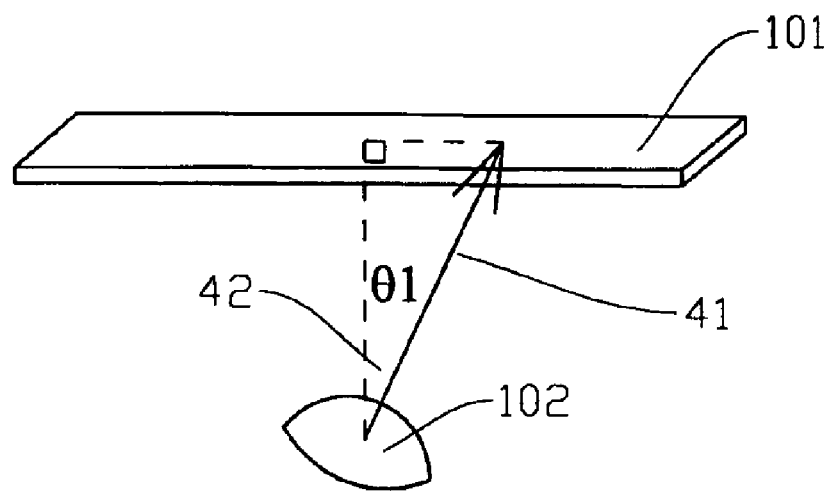
FIG. 4A shows the inclination along X-axis direction of a traditional optical scanning device.
Figure 4B:
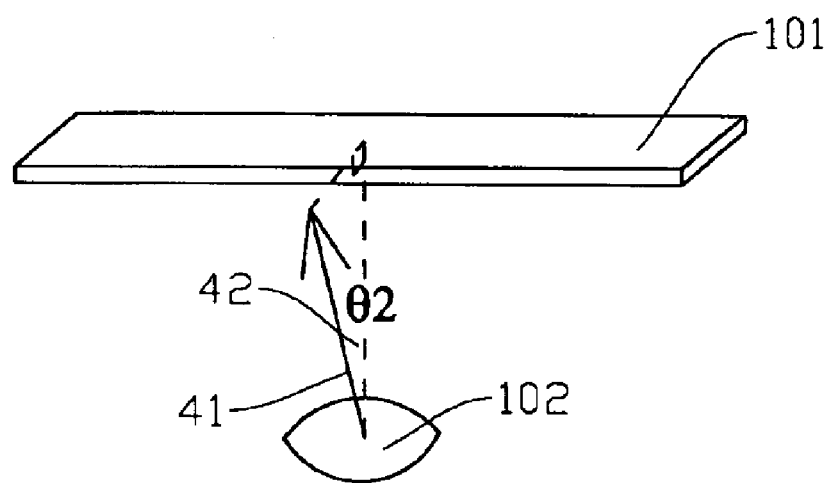
FIG. 4B shows the inclination along X-axis direction of a traditional optical scanning device.
Figure 5:
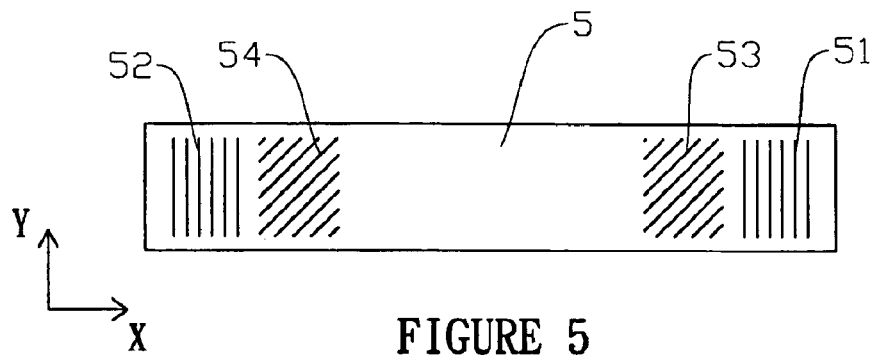
FIG. 5 shows the calibration device of the present invention.
Figure 6:
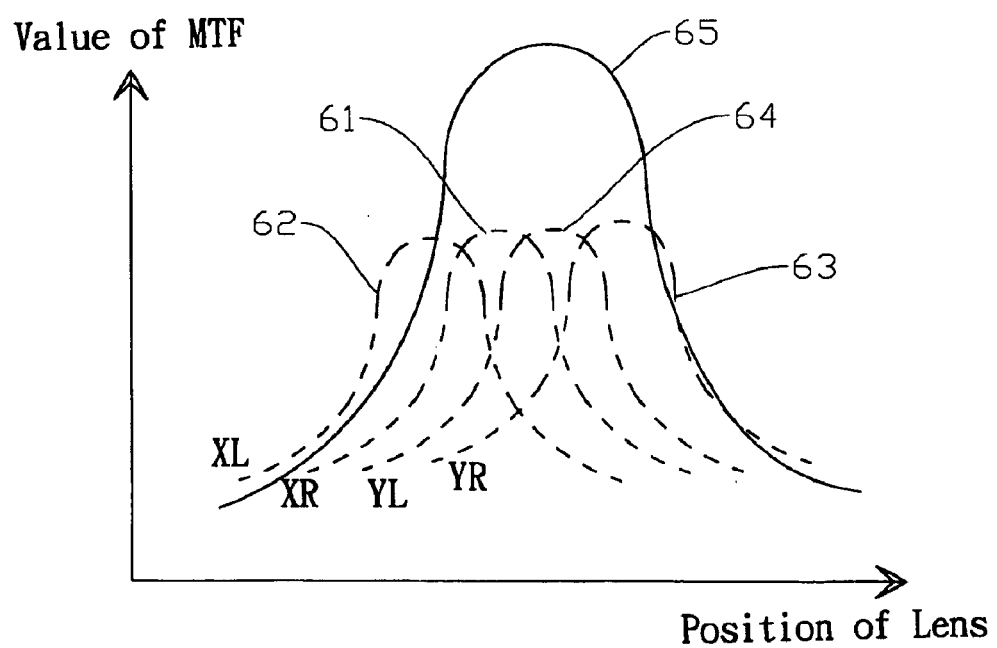
FIG. 6 shows the chat of MTF-PL of the present invention.

Please refer to FIGS. 5 and 6. FIG. 5 shows the calibration device of the present invention. The X-axis direction is along horizontal direction shown in the lower-left position of FIG. 5. The Y-axis direction is along vertical direction. The calibration device 5 has an XR print 51. The print 51 contains a plurality of parallel perpendicular lines. When the technicians apply an adjusting device for assembling, the adjusting device will generate a parameter $X_R$ for representing the right side of the horizontal resolution. The value of $X_R$ will vary with different positions of the lens, shown as XR curve 61 of FIG. 6. In addition, the calibration device further has a YR print. The YR print contains a plurality of inclined parallel lines. The inclination angular is between zero and forty-five degrees from the horizontal direction. In this case, the adjusting device will generate a value of right side of MTF, denoted as legend $Y_R$. The value of $Y_R$ represents the right side of the vertical resolution. The value of $Y_R$ varies with different positions of the lens, shown as the YR curve 62 in the FIG. 6. Accordingly, the calibration device has an XL print and a YL print. The adjusting device is able to generate a left horizontal MTF value and a left vertical MTF value by the XL and YL prints, denoted as $X_L$ and $Y_L$. The $X_L$ and $Y_L$ represent the left side horizontal resolution and the left side vertical resolution.

When the calibration device receive the parameters $X_R$, $Y_R$, $X_L$ and $Y_L$, a total value of MTF, denoted as A, is generated as $A=X_R+X_R+X_L+Y_L$. The legend A represents the total resolution of the scanning module. Larger value of A means better resolution.

Further, regarding the precision during assembly, the lens may incline along left and right directions or along front and rear directions. In this case, the resolution may be unable to be balanced. In order to overcome the above problems, a horizontal balance value is generated as $|X_R-X_L|$. Smaller $|X_R-X_L|$ means smaller difference of the horizontal resolution. Accordingly, the vertical balance value is $|Y_R-Y_L|$. Smaller $|Y_R-Y_L|$ means smaller difference of the vertical resolution. Moreover, a left side of the balance value is considered as $|X_L-Y_L|$. Smaller $|X_L-Y_L|$ means smaller difference between the left side of the vertical resolution and the left side of the horizontal resolution. A right side of the balance value is considered as $|X_R-Y_R|$. Smaller $|X_R-Y_R|$ means smaller difference between the right side of the vertical resolution and the right side of the horizontal resolution. Thus a balance value B of the M is considered as $B=|X_R-X_L|+|Y_R-Y_L|+|X_L-Y_L|+|X_R-Y_R|$. The value of B represent the sum of MTF balance values of the scanning module. Smaller value of B means better balance of the scanning module.

In view of the above, C is considered as a referencing parameter which is calculated as C=A−B. Larger C means better resolution and better balance of the scanning module.

The adjusting device further provides a display for displaying the parameters described in the above. The displaying method could be a digital type. The assembling technicians can reference the value of the parameters by the help of the display, during the assembling process. The displaying method could be a light indicating type. The technicians can reference the light in order to determine whether the parameters achieve the optimizing values. In this cases, the parameters can improve the assembling quality, regrading the resolution.

Figure 7:
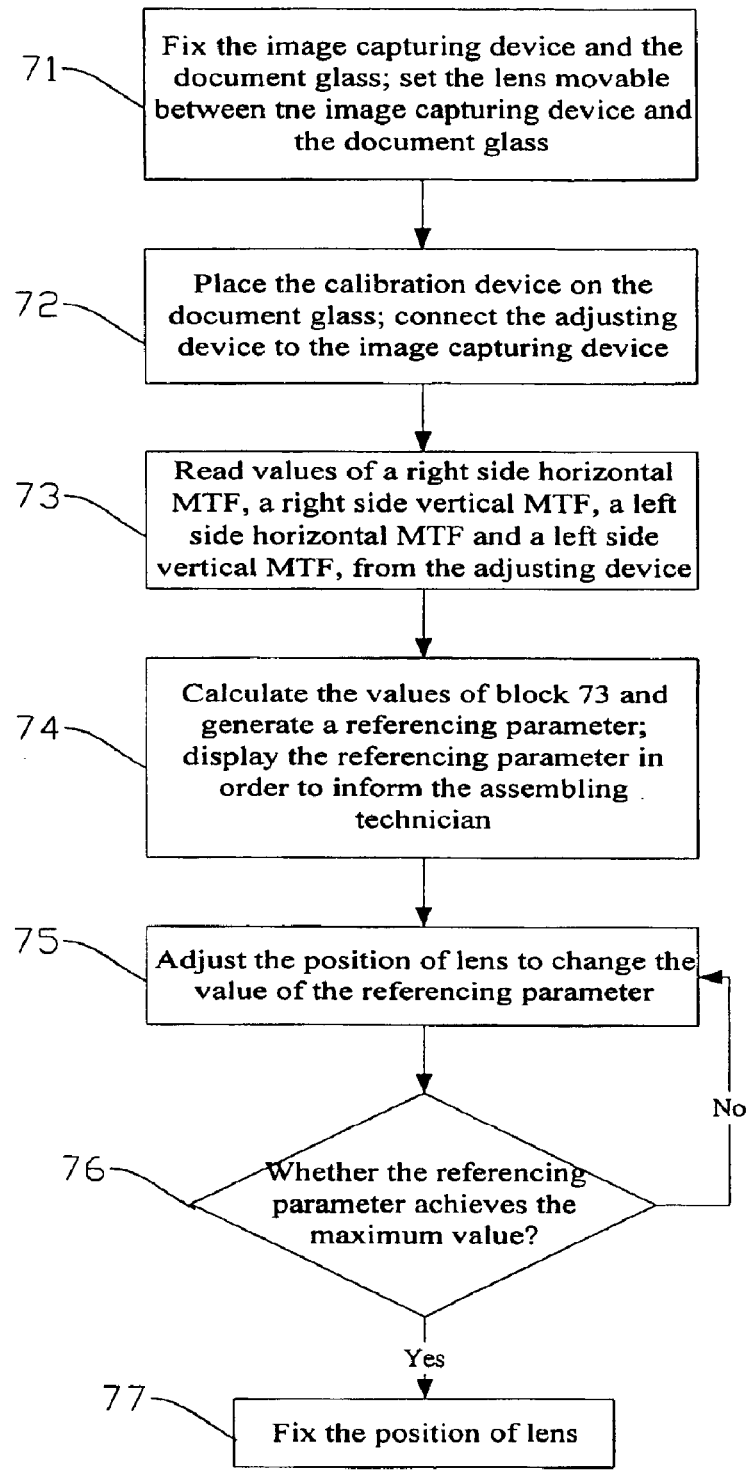
FIG. 7 shows a diagram illustrating assembling processes of the present invention.

According to the calibration device and the adjusting device mentioned in the above, the method of the present invention for optimizing the best resolution is described as follows. Please refer to FIG. 7. FIG. 7 shows the diagram of the assembling processes. An assembling technician first fixes positions of an image capturing device and a document glass in predetermined positions. Further, a lens is positioned between the image capturing device and the document glass, maintaining movable status, as step 71. In step 72, a calibration device is placed on the document glass; and an adjusting device is connected to the image capturing device. The adjusting device is able to read values of a right side of horizontal MTF, a right side of vertical MTF, a left side of horizontal MTF and a left side of vertical MTF as shown in step 73. In step 74, the adjusting device is able to generate a adjusting parameter by referencing the values of the right side of horizontal MTF, the right of vertical MTF, the left side of horizontal MTF and the left side of vertical MTF. Consequently, the assembling technician adjusts the position of the lens and pay attention to the variances of the adjusting parameter, as illustrated in step 75. In step 76, the technician can observe the weather the adjusting parameter achieves the maximum value. If the adjusting parameter does not achieve the maximum value, the process will back to step 75. However, if the adjusting parameter achieves the maximum, the technician will fix the position of the lens, shown as step 77. In this case, the assembling processes are completed.

Although preferred embodiments of the present invention have been described in the forgoing description and illustrated in the accompanying drawings, it will be understood that the invention is not limited to the embodiments disclosed, but is capable of numerous rearrangements, modifications, and substituting of parts and elements without departing from the spirit and scope of the invention. Accordingly, the present invention is intended to encompass such rearrangements, modifications, and substitutions of parts and elements as fall within the scope of the appended claims.

What is claimed is:

1. A method for optimizing the best resolution of an optical scanning device, said method employed in assembling processes for enabling an assembling technician to find the best resolution, said optical scanning device including at least an image capturing device, a lens and a document glass, with support of a calibration device and an adjusting device, said method comprising the steps of:

(1) fixing said image capturing device and said document glass in a predetermined position, said lens is movable between said image capturing device and said document glass;

(2) placing said calibration device on said document glass and connecting said adjusting device to said image capturing device;

(3) reading values of a right side horizontal MTF, a right side vertical MTF, a left side horizontal MTF and a left side vertical MTF from said adjusting device;

(4) calculating the values of said right side horizontal MTF, said right side vertical MTF, said left side horizontal MTF and said left side vertical MTF to generate a referencing parameter, wherein said referencing parameter is displayed in order to inform said assembling technician; and (5) adjusting the position of said lens, when the value of said referencing parameter achieving a relative big value, fixing said lens, wherein said referencing parameter is the sum of the values of said right side horizontal MTF, said right side vertical MTF, said left side horizontal MTF and said left side vertical MTF.

2. The method of claim 1, wherein the step(4) of generating, said referencing parameter is the difference between a value of a balance MTF and the sum of the values of said right side horizontal MTF, said right side vertical MTF, said left side horizontal MTF and said left side vertical MTF.

3. The method of claim 2, wherein the value of said balance MTF is the sum of the absolute value of left side horizontal MTF minus the right side horizontal 1 MTF and the absolute value of left side vertical MTF minus the right side vertical MTF.

4. The method of claim 2, wherein the value of said balance MTF is the sum of the absolute value of left side horizontal MTF minus the right side vertical MTF and the absolute value of left side vertical MTF minus the right side horizontal MTF.

5. The method of claim 2, wherein the value of said balance MTF is the sum of the absolute value of left side horizontal MTF minus the right side horizontal 1 MTF, the absolute value of left side vertical MTF minus the right side vertical MTF, the absolute value of left side horizontal MTF minus the right side vertical MTF and the absolute value of left side vertical MTF minus the right side horizontal MTF.

6. The method of claim 1, wherein the step(4) of displaying, said adjusting device further comprising a display for display said referencing parameter.

7. The method of claim 6, wherein said display is digital type for displaying said referencing parameter.

8. The method of claim 6, wherein said display is light indicating type for displaying said referencing parameter.

9. The method of claim 1, wherein said image capturing device is a chargedcoupled device.

* * * * *